United States Patent [19]

Cutburth et al.

[11] Patent Number: 4,743,763
[45] Date of Patent: May 10, 1988

[54] ARTICLE MOUNTING AND POSITION ADJUSTMENT STAGE

[75] Inventors: Ronald W. Cutburth, Tracy; Leonard L. Silva, Livermore, both of Calif.

[73] Assignee: The United States of America as repesented by the United States Department of Energy, Washington, D.C.

[21] Appl. No.: 911,844

[22] Filed: Sep. 26, 1986

[51] Int. Cl.$^4$ .................................................. G02B 7/02
[52] U.S. Cl. ........................................ 250/239; 74/55; 350/252; 350/633
[58] Field of Search ............... 250/239; 33/615, 621; 350/252, 562, 565, 566, 633; 74/55

[56] References Cited

U.S. PATENT DOCUMENTS 3,357,268 12/1967 Richter .................................. 350/633
3,713,725 1/1973 Vesugi .................................... 350/252

Primary Examiner—Edward P. Westin
Assistant Examiner—Khaled Shami
Attorney, Agent, or Firm—P. Martin Simpson, Jr; L. E. Carnahan; Judson R. Hightower

[57] ABSTRACT

An improved adjustment and mounting stage of the type used for the detection of laser beams is disclosed. A ring sensor holder has locating pins on a first side thereof which are positioned within a linear keyway in a surrounding housing for permitting reciprocal movement of the ring along the keyway. A rotatable ring gear is positioned within the housing on the other side of the ring from the linear keyway and includes an oval keyway which drives the ring along the linear keyway upon rotation of the gear. Motor-driven single-stage and dual (x, y) stage adjustment systems are disclosed which are of compact construction and include a large laser transmission hole.

19 Claims, 3 Drawing Sheets

ARTICLE MOUNTING AND POSITION ADJUSTMENT STAGE

FIELD OF THE INVENTION

The United States has rights in this invention pursuant to Contract No. W-7405-ENG-48 between the U.S. Department of Energy and the University of California for operation under Lawrence Livermore National Laboratory.

BACKGROUND OF THE INVENTION

The present invention relates to position adjuster apparatus and, in particular, to apparatus for adjusting an article or system such as a lens mount or mirror mount or optical beam sensor in x or x, y coordinates.

In general, the present invention is applicable to items or systems which require or would benefit from precise, convenient position adjustment along one or more co-planar directions such as, for example, the above-mentioned sensors used in optical systems. In one specific aspect, the present invention relates to an adjustable mount or stage of the type which has an aperture or optical window for transmitting an optical beam, and which mounts an electromagnetic sensor in the aperture to detect the beam position. Quite obviously, in such adjustment stages it is highly desirable to provide a large area beam transmission aperture or hole.

An efficient ring-type precision adjustable stage is disclosed in copending commonly assigned Cutburth and Silva U.S. patent application Ser. No. 911,845, filed Sept. 26, 1986, entitled PRECISION ADJUSTABLE STAGE. Cutburth and Silva disclose a stage center block which is mounted on each of two opposite sides by a pair of spaced ball bearing tracks which provide stability as well as simplicity. The use of the spaced ball bearing mounting pairs in conjunction with a manual adjustment screw eliminates extraneous stabilization components which may be required, for example, in micrometer-type, differential motion systems, and permits maximization of the area of the laser transmission hole. However, to our knowledge, previously there has not been available a precision adjustable motorized stage which is compact, yet provides a large area beam transmission hole.

SUMMARY OF THE INVENTION

In view of the above discussion, it is one object of the present invention to provide a precise adjustment mount or stage which is motor operated, yet is compact and relatively simple in design.

It is another, related object of the present invention to provide such an adjustable motorized stage in which a large percentage of the stage surface area is available for beam transmission.

In one embodiment, the motorized adjustment mount or stage of the present invention includes a first annular plate or ring having a large laser beam transmission hole therein. This ring serves as a mount for an object such as a laser beam sensor. A pair of spaced locating pins are mounted to the ring and extend from a first side thereof; a third location pin extends from the second side of the ring. The sensor mounting ring is mounted within a generally enclosed housing having end walls with laser transmission holes therein. The mounting ring is positioned between and generally parallel to the housing end walls, closely adjacent to one end wall which has a linear keyway therein for receiving the pair of mounting ring locating pins to permit reciprocal movement of the mounting ring along the keyway. A ring gear is positioned within the housing adjacent the mounting ring and has an eccentric keyway closely adjacent the second side of the ring for receiving the third locating pin.

Preferably a motor-driven pinion gear is mounted to the housing for rotating the ring gear to thereby move the ring mount along the linear keyway.

In a preferred compact embodiment, the pinion gear drive motor is mounted with the drive shaft thereof generally perpendicular to the plane of the mounting ring.

A co-planar two-axis, xy-adjustment stage system is provided by joining two of the above stages so that their linear keyways and associated directions of movement are oriented at right (or other) angles.

Additional objects, advantages and novel features of the present invention will be set forth in part in the description which follows, and in part will become apparent to those skilled in the art upon examination of the following, or may be learned by practicing the invention. The objects, features and advantages of the invention may be realized and attained by means of the instrumentality and combinations which are particularly pointed out in the appended claims.

BRIEF DESCRIPTION OF THE DRAWINGS

The accompanying drawings, which are incorporated in and form part of the specification, illustrate a preferred embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment and alternatives thereof, it will be understood that it is not intended to limit the invention to that embodiment or to those embodiments. On the contrary, it is intended to cover all alternatives, modifications and equivalents as may be included within the spirit and scope of the invention as defined by the appended claims.

Figure 1:
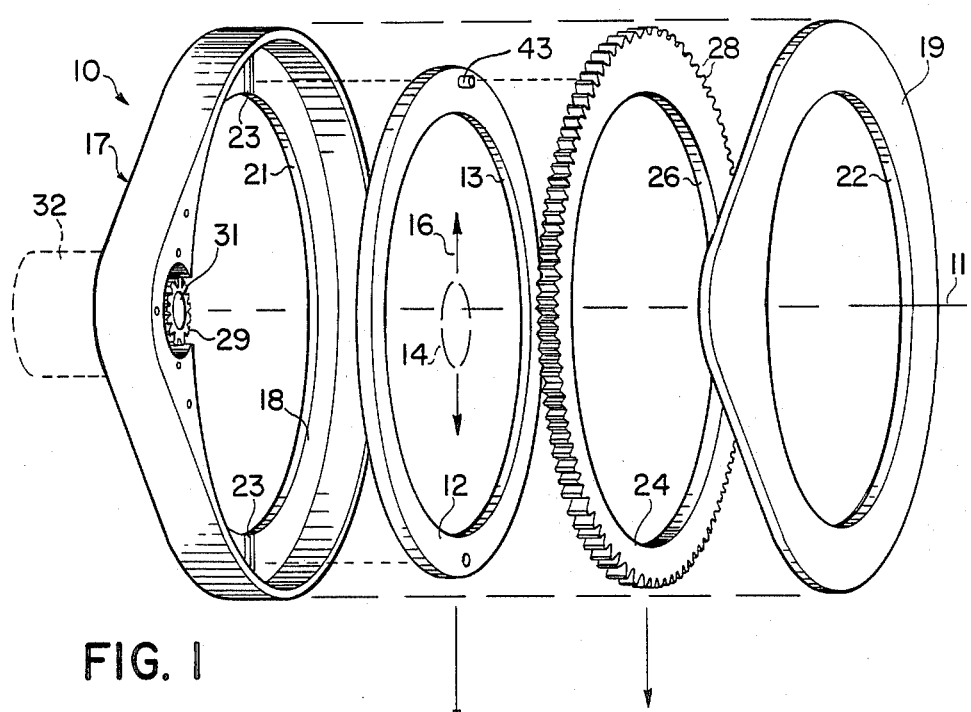
FIG. 1 is an exploded perspective view of a motorized adjustment stage which embodies the present invention, viewed from the perspective of the (arbitrarily designated) right side of the stage.
Figure 2:
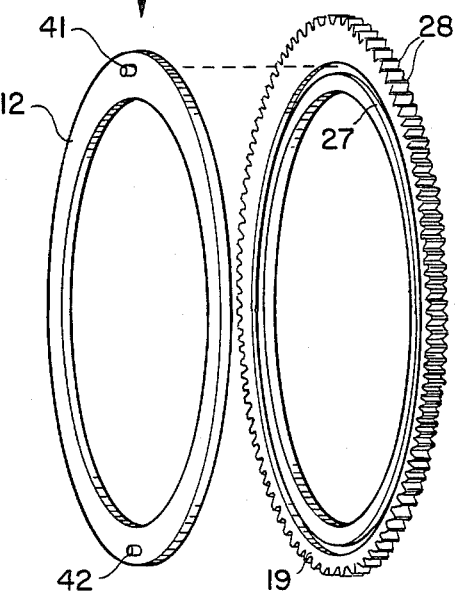
FIG. 2 is a partial, reverse angle (left perspective) exploded perspective view of the motorized adjustment stage of FIG. 1.

Referring initially to FIG. 1, there is shown an exploded perspective view of a motorized adjustment stage 10 which incorporates our present invention, taken from the perspective of the right side of the stage. In the exemplary embodiment, the stage 10 has a hole or optical window for allowing transmission of a beam such as a laser beam along its optic axis or path 11. (Axis 11 is referenced alternatively here as the laser beam path or, simply, as the laser beam itself.) The stage 10 includes an annular plate or ring 12 which preferably has a large laser transmission hole 13. An electromagnetic beam sensor 14 is mounted to the ring 12 within the laser transmission hole by conventional mounting means (not shown) so that, as described in detail below, reversible movement of the ring along the adjustment axis 16 adjusts the position of the sensor 14 relative to the beam path 11. The mounting ring 12 has a pair of locating pins 41 and 42 mounted to opposite ends of the left face thereof (FIG. 2) and a third locating pin 43 in the right face thereof (FIG. 1).

The ring 12 is positioned within a generally enclosed housing which comprises a base 17 having a generally planar end wall 18 (also termed the left end wall 18) and a cover 19 (also termed the right end wall 19). The base 17 and cover 19 have respective laser transmission holes 21 and 22 formed therein. A generally linear, diametrical keyway 23 is formed in the inner surface of the left end wall 18 facing the ring 12 so that the left side locating pins 41 and 42 (see FIG. 2) mate with, i.e., are located in, the keyway 23. As a result, the keyway 23 prevents rotation of the ring 12 and limits movement of the ring to the linear path of movement 16 defined by the upper and lower keyway sections.

A ring gear or cam 24 having a laser transmission hole 26 and an eccentric (off-center) circular groove or keyway 27 (FIG. 2) is positioned within the housing on the right side of and closely adjacent to the ring 12 so that the right side locating pin 43 mates with, i.e., is located in, the circular keyway 27. Gear teeth 28 are formed in the periphery of the ring gear 24. The gear 24 is rotated by a pinion drive gear 29 which is mounted on drive shaft 31 of motor 32. The motor 32 is mounted to the left side wall 18 of the housing by mounting bolts or other conventional fasteners (not shown).

Rotation of the motor 32 and the pinion gear 29 rotates the ring gear or cam 24. When the ring gear 24 is rotated, the keyway 23 and cooperating locating pins 41 and 42 prevent rotation of the ring 12. Instead, keyway 27 reversibly drives pin 43 and ring 12 and sensor 14 along the path 16 defined by keyway 23. One full revolution of movement of the gear cam 24 moves the ring mount 12 and the sensor 14 through a complete cycle of reversible (up and down) movement along path 16. Therefore, at most, one complete revolution of ring gear 24 is necessary to adjust the ring 12 and sensor 14 to a position anywhere along the extremes of its reversible path of movement 16. Alternatively, if a reversible motor 32 is used, the sensor 14 can be driven directly to any desired position using a maximum of one-half of a revolution of the ring gear 24.

Preferably, the rotatable pinion drive means 32 is a precisely controllable motor, such as a stepping motor or a reversible stepping motor, since such conventional motors provide precisely, repeatable increments of radial movement and, thus, afford excellent control of the position of the eccentric 12 and sensor 14 along the adjustment path 16.

Referring to FIG. 1, preferably, to provide a very compact configuration which minimizes the amount of surface area occupied by the housing in the vertical plane (the plane of the housing corresponding generally to the plane of the left end wall 18 and cover 19), the motor 32 is mounted so that its drive shaft 31 is generally perpendicular to the plane of the housing. That is, the motor is mounted at one side of the housing (right or left side as viewed in FIG. 1) substantially within the confines of the housing. Even with this motor orientation, there is no extraneous structure (such as the motor) within the boundary of the ring 12 or ring gear 24. Consequently, the system beam transmission hole 45 (FIG. 5), which is formed collectively by holes 21-13-26-22 (FIG. 1), can correspond substantially to the entire area of the ring hole 13 and the ring gear hole 26. The resulting large hole 45 permits the use of a laser beam 11 having a large cross-section and the use of a long adjustment distance along path 16. Also, the through-hole beam arrangement decreases the distance between the beam and the associated adjustment and mounting apparatus and thus enhances beam control and stability.

Figure 3:
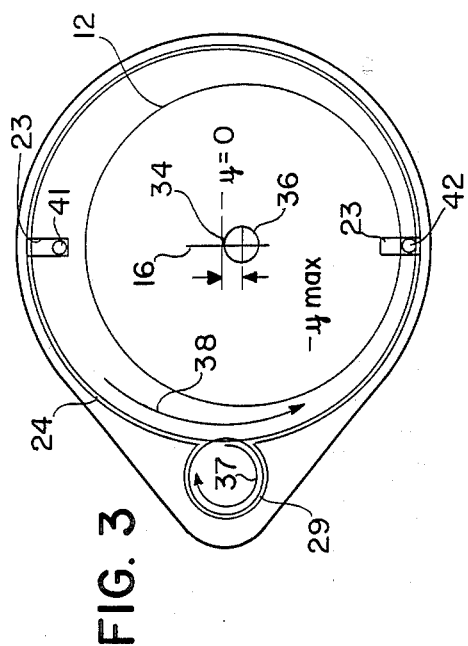
FIGS. 3 and 4 are vertical section views of the motorized adjustment stage of FIG. 1 illustrating movement of the ring gear and ring mount.
Figure 4:
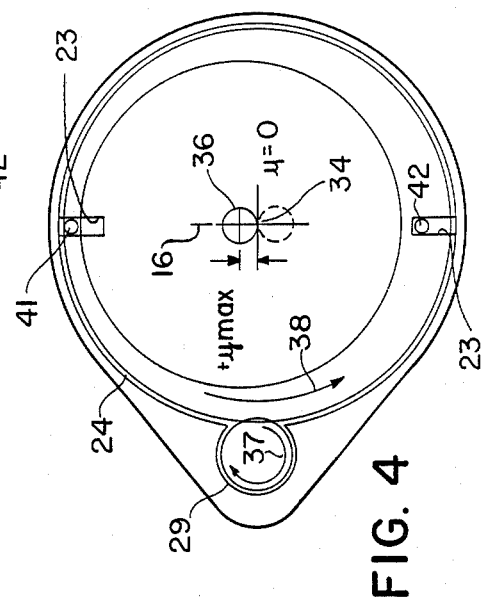

The reversible movement of the eccentric 12 is depicted in FIGS. 3 and 4. In these two figures, the center of the housing and, typically, the location of the optic axis are indicated by reference numeral 34. The position of the center of the ring 12 is indicated by reference numeral 36. Starting with the ring 12 centered on the optic axis (34 and 36 coincident), movement of the pinion gear 29 in the clockwise (CW) direction indicated schematically by arrow 37 rotates the ring gear cam counterclockwise (CCW), as indicated by the arrow 38. This moves the ring 12 downwardly along the path 16, FIG. 1. As shown in FIG. 3, 90° counterclockwise rotation of the ring gear 24 moves the ring 12 to the extreme $-y$ position, $-y_{max}$. An additional 90° counterclockwise rotation (180° CCW total rotation) moves the ring 12 back to the y origin. Still another 90° counterclockwise rotation (270° CCW total rotation) moves the ring 12 to the extreme $+y$ position, $+y_{max}$, which is shown in FIG. 4. Finally, an additional 90° counterclockwise rotation of the ring gear 24 (360° CCW total rotation) returns the ring 12 to the y origin.

To summarize, counterclockwise (clockwise) rotation of the ring gear 24 through 90°, 180°, 270° and 360° moves the ring mount 12 and associated sensor 14 to the $-y_{max}$ ($+y_{max}$); 0 (0); $+y_{max}$ ($-y_{max}$); and 0 (0) y coordinates.

The diametrical keyway 23 and associated pins 41 and 42 convert the rotation and side load of the eccentric 27 and offset motor 32 into stable smooth adjustment along path 16.

Figure 5:
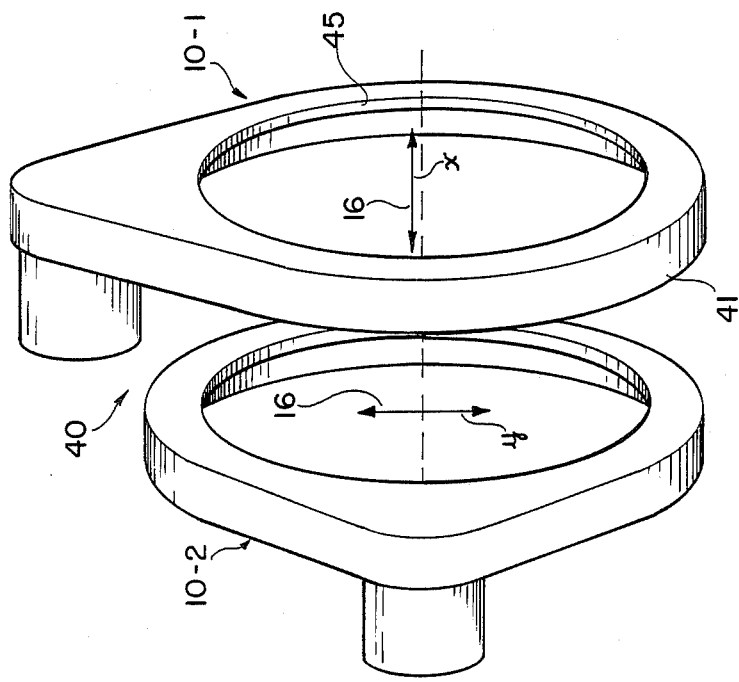
FIG. 5 is an exploded schematized perspective view of an x, y adjustment stage system incorporating two adjustment stages of the type shown in FIG. 1.

FIG. 5 is a highly schematized exploded perspective view of an x, y adjustment system 40 incorporating two of the adjustment stages described above. These stages are identified as 10-1 and 10-2 for clarity. The two stages 10-1 and 10-2 are mounted so that their adjustment axes are oriented at 90° to provide x or y adjustment or co-planar xy adjustment. In the combined two-stage adjuster 40, typically the sensor 14 or other device is mounted to the ring mount 12 of one stage 10-1 and that stage in turn is mounted to the ring mount of the second stage 10-2.

Please note, in FIGS. 3, 4 and 5 the illustrated stages 10, 10-1, 10-2 have the pinion 29 and motor 32 located along a line oriented at an angle of about 90° to path 16 (see FIGS. 3 and 4). This is by no means the only possible orientation. In fact, the motor and pinion can be located at any desired angle relative to path 16.

Figure 6:
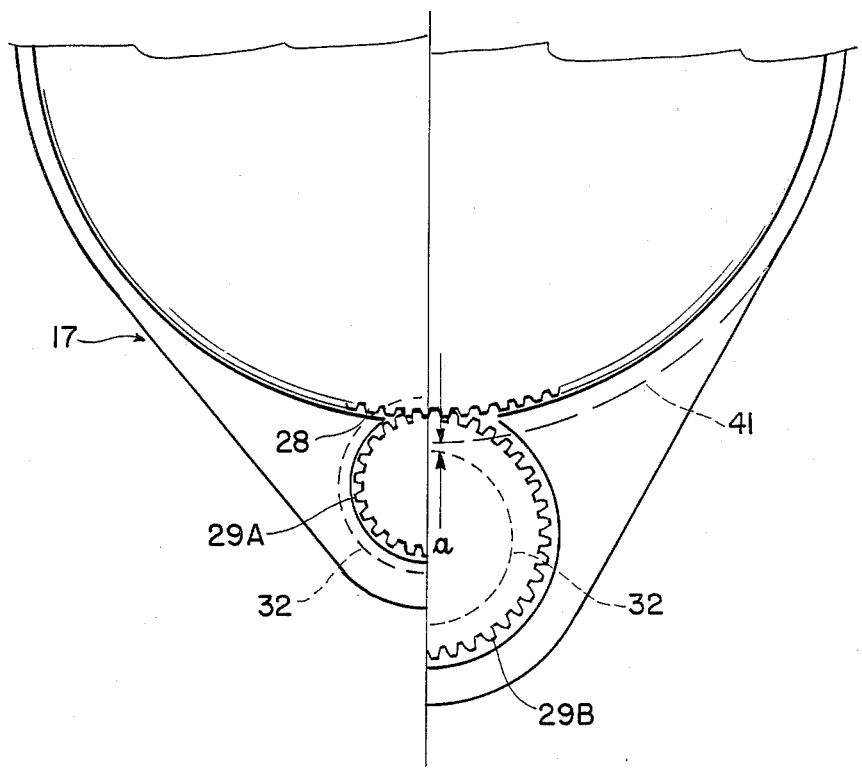
FIG. 6 schematically illustrates an alternative pinion gear and motor mounting arrangement.

FIG. 6 schematically illustrates alternative design and mounting approaches for the drive motor 32 and the pinion gear 29. The left-hand side of the figure shows a compact configuration for a single-stage system. Here, the pinion gear 29A is of relatively small diameter, thus permitting the use of a relatively small housing. However, because of the small size of pinion gear 29A, the relatively larger motor 32 intrudes within the confines of the housing perimeter 41 (i.e., the circular portion of the housing). This motor location would interfere with a second stage if this first stage were mounted over the second stage with the first stage motor unit facing towards the second stage as shown in FIG. 5. Thus, this very compact configuration may preclude the compact overall configuration shown in FIG. 5 in which both motors 32 extend from the same sides of their respective stages 10.

The right half of FIG. 6 discloses a motor and pinion gear configuration which is presently preferred for compact two-stage units. Here, the pinion gear 29B is larger and provides clearance "a" between the motor 32 and the housing perimeter 41. As the result of its relocation outside the housing perimeter 41, the motor 32 does not interfere with the second stage in any position. Thus, a compact two-stage configuration can be used in which the motor units 32—32 face the same direction (FIG. 5) and the two stages 10—10 can be rotated to provide any desired angle between their two adjustment axes 16—16.

The foregoing description of the preferred and alternative embodiments of the invention is presented for purposes of illustration and description. It is not intended to be exhaustive or to limit the invention to the precise forms disclosed and, obviously, many modifications and variations are possible in light of the above teaching. The preferred embodiment was chosen and described in order to best explain the principles of the invention and its practical application to thereby enable others skilled in the art to best utilize the invention and various embodiments and with various modifications as are suited to the particular use contemplated. For example, the locating pin 43 could be on the same side of the ring 12 as the pair of locating pins 41 and 42, with the pins 41 and 42 and their path of travel outside or inside the eccentric 27 so as not to interfere with the operation of the eccentric 27. This arrangement would, however, require a larger housing or a smaller optical window or hole therein. It is, thus, intended that the scope of the invention be defined only by the claims appended hereto.

What is claimed is:

1. An adjustment stage for selectively adjusting the position of an object transverse to an axis through a hole in said stage, comprising:
    a ring adapted for mounting said object, said ring having a pair of spaced apart locating pins extending therefrom and a third locating pin extending therefrom;
    a housing for holding said ring and having first and second end walls with beam transmission holes therein coincident with said axis, the first end wall having a keyway therein adjacent said ring extending transverse to said axis for receiving said pair of locating pins to permit reciprocal movement of said ring along a path defined by said transverse keyway;
    a ring gear having an eccentric keyway on one side thereof adjacent said ring for receiving the third locating pin; and
    means for rotating said ring gear to thereby move said ring and mounted object along said path.

2. An adjustment stage for selectively adjusting the position of an object transverse to an axis through a hole in said stage, comprising:
    a ring adapted for mounting said object, said ring having a beam transmission hole coincident with said axis and having a pair of spaced apart locating pins extending from a first side thereof and a third locating pin extending from a second opposite side thereof;
    a housing for holding said ring and having first and second end walls with beam transmission holes therein coincident with said axis, the first end wall having a linear diametrical keyway therein adjacent the first side of said ring extending transverse to said axis for receiving said pair of locating pins to permit reciprocal movement of said ring along a path defined by the linear keyway transverse to said axis;
    a ring gear having an eccentric keyway on one side thereof adjacent the second side of said ring for receiving the third locating pin; and
    means for rotating said ring gear to thereby move said ring and mounted object along said path.

3. The adjustment stage of claim 2, said rotating means comprising a motor mounted to said housing and having a drive shaft transverse to the plane of said ring gear, and a pinion gear mounted on the drive shaft for rotating said ring gear.

4. The adjustment stage of claim 2, wherein said rotating means is adapted for rotating said ring gear to move said ring to selected points along said path.

5. The adjustment stage of claim 2, said rotating means being adapted for reversible rotation to move said ring to selected points along said path.

6. The adjustment stage of claim 2, further comprising at least a second stage including a second said ring for moving along a second said path, the housing of the second stage being mounted to said ring of the first stage for moving the second stage along said first path at a selected angle relative to said second path.

7. The adjustment stage system of claim 6, each stage further comprising rotating means comprising a motor having a drive shaft transverse to the plane of said ring gear, and a pinion gear mounted on the drive shaft for rotating said ring gear.

8. The adjustment stage system of claim 7, said motor being adapted for rotating said ring gear to move said ring to selected points along said path.

9. The adjustment stage system of claim 7, said motor being adapted for reversible rotation to move said ring to selected points along said path.

10. A position adjustment system comprising at least one adjuster stage for providing transverse adjustment of the position of an object relative to an axis through a hole in the adjuster stage, each adjuster stage comprising:
    a housing having beam transmission holes formed in opposite sides thereof coincident with said axis;
    a ring positioned within said housing and having a beam transmission hole therein coincident with said axis, said ring being adapted for mounting said object within the hole therein and further comprising first and second opposite sides;
    a pair of first and second pins mounted to and extending from the first side of said ring and a third pin mounted to and extending from the second side of said ring;

a rotatable ring gear positioned within said housing and having a beam transmission hole therein coincident with said axis and further comprising a toothed peripheral surface for permitting rotational engagement thereof;

said housing including a keyway extending transverse to said axis and receiving the first and second pins for permitting reversible sliding movement of said pins and said ring along said keyway;

said rotatable ring gear further comprising a substantially oval keyway formed in one side thereof facing said second side of the ring and slidably receiving said third pin for moving said ring along said transverse keyway during rotation of said ring gear; and means for rotating said ring gear.

11. The position adjustment system of claim 10, said rotating means comprising a motor having a drive shaft generally perpendicular to the plane of said ring gear and a pinion gear mounted on said drive shaft for rotatably engaging said ring gear.

12. The position adjustment system of claim 11, said motor being adapted for rotating said ring gear through at least one full revolution to move said ring to selected points along said path.

13. The position adjustment system of claim 12, said motor being adapted for reversible rotation through preselected distances for moving said ring to selected points along its path.

14. The position adjustment system of claim 10, wherein the beam transmission hole in said stage is an optical hole permitting transmission of a light beam therethrough and said object is a sensor for detecting the light beam traversing said optical transmission hole.

15. The adjustment stage of claim 1, wherein the beam transmission hole in said stage is an optical hole permitting transmission of a light beam therethrough and said object is a sensor for detecting the light beam traversing said optical transmission hole.

16. The adjustment stage of claim 2, wherein the beam transmission hole in said stage is an optical hole permitting transmission of a light beam therethrough and said object is a sensor for detecting the light beam traversing said optical transmission hole.

17. The adjustment stage of claim 6, wherein the beam transmission hole in said stage is an optical hole permitting transmission of a light beam therethrough and said object is a sensor for detecting the light beam traversing said optical transmission hole.

18. The adjustment stage of claim 3, wherein said motor is adapted for rotating said ring gear to move said ring to selected points along said path.

19. The adjustment stage of claim 3, said motor being adapted for reversible rotation to move said ring to selected points along said path.

* * * * *